Oct. 2, 1923.
J. J. McQUAID ET AL
1,469,424
END THRUST BALL BEARING
Filed Jan. 18, 1922
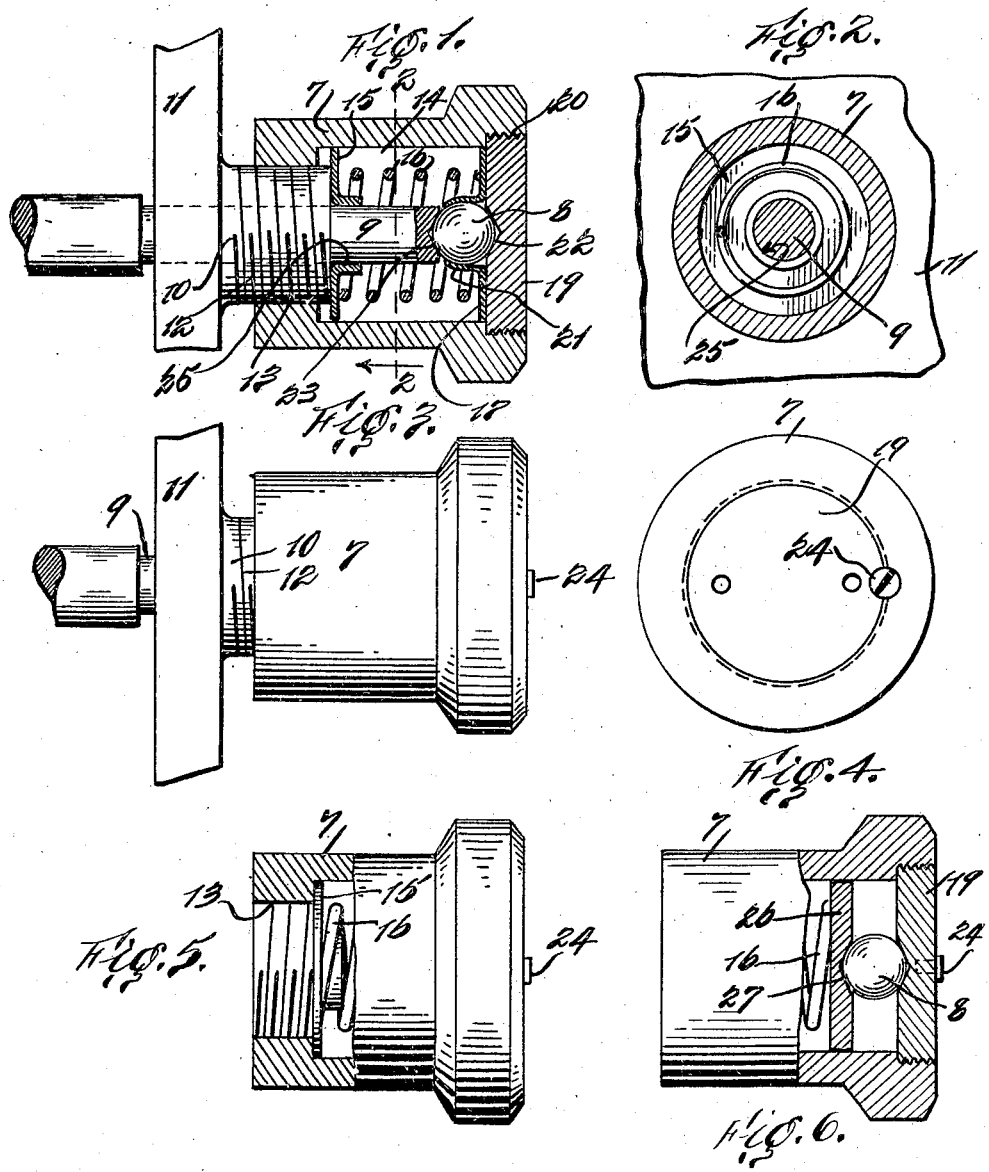
Inventors
John J. McQuaid
Nicholas W. Samuels.
By their Attorney
Maurice Bloch Patented Oct. 2, 1923.

1,469,424

UNITED STATES PATENT OFFICE.

JOHN J. McQUAID, OF BROOKLYN, AND NICHOLAS W. SAMUELS, OF NEW YORK, N. Y.

END-THRUST BALL BEARING.

Application filed January 18, 1922. Serial No. 530,090.

*To all whom it may concern:*

Be it known that we, JOHN J. McQUAID and NICHOLAS W. SAMUELS, residents of Brooklyn, Kings County, State of New York, and New York city, county and State of New York, respectively, and citizens of the United States of America, have invented certain new and useful Improvements in End-Thrust Ball Bearings, of which the following is a specification.

This invention relates to improvements in thrust bearings, one of the objects being to provide a ball thrust bearing for the shaft of devices such as fishing reels, phonograph-motors, sewing machines, etc. A further object of our invention is to provide an inexpensive efficient adjustable thrust bearing, or one arranged to take up slack or wear.

We will now proceed to describe our invention in detail, the novel features of which we will point out in the appended claims, reference being had to the accompanying drawing, wherein:—

Fig. 1 illustrates a sectional view of our invention as applied for use;

Fig. 2 is a sectional view on line 2—2 in Fig. 1;

Fig. 3 illustrates our improved device in elevation;

Fig. 4 is an end view thereof, looking from the right in Fig. 3;

Fig. 5 is a sectional view, partly in elevation, illustrating the ball cage when not in use; and Fig. 6 is a similar view of a modified form of our invention.

Our invention comprises a cage 7 to contain an antifriction ball 8 arranged to bear against the end of a shaft 9, the cage 7 being designed to engage a lug 10 on the support 11, said lug being threaded at 12 to engage similar threads in the opening 13 in the one end of the cage 7. As can be seen, shaft 9 passes through lug 10 centrally thereof; hence, the axes of the shaft and cage will aline. Cage 7 is provided with a bore 14 somewhat larger in diameter than opening 13 to contain a thrust-plate 15, spring 16 and retainer 17 for ball 8, said retainer bearing against cover plate 19 in the adjacent end of cage 7. In this instance, plate 19 has a threaded engagement with said cage, a counterbore 20 being provided to receive said plate, the wall of the counterbore being threaded to engage the threads on plate 19. The ball retainer 17 carries a socket member 21 to carry ball 8, the ball extending partly through the end of the socket in order that it will bear against the shaft. The ball retainer 17 will be pressed against plate 19 by the spring 16. Plate 19 is provided with a recess or seat 22 for the ball 8, the end of shaft 9 being also provided with a seat or recess 23 to receive the ball. The thrust plate 15 is forced either against the end of lug 10 or end wall of bore 14 by the spring 16 dependent upon whether the cage is in use or not (see Figs. 1 and 5). The spring 16 will have sufficient tension to maintain ball retainer against plate 19 even though the cage is not in use; for this reason the ball will always remain in position even though the cage be removed from the lug or projection 10. When the cage is applied to lug 10 and screwed up, the end of lug 10 will contact with thrust plate 15, and as the cage is still further screwed up, plate 15 will be forced away from the end of lug 10, thereby placing spring 16 under increased tension. The spring 16 will act as a lock to prevent cage 7 from becoming loosened, and work off by vibration, as it will force the threads of the lug and threads in the opening 13 of the cage firmly together and at the same time hold the ball retainer 17 in position. Should wear result from constant use, the cage can be screwed up further to take up the wear.

The cover plate 19 is preferably removable in order to renew parts, if necessary, the plate being held in position by a set-screw 24, in this instance. The thrust plate 15 is slidably engaged by shaft 9; in other words, the shaft will pass freely through said plate. Both the plate 15 and retainer 17 will slidably fit the bore 14 of the cage 7; hence, ball 8 as well as opening 25 in plate 15 will be coincident with the axis of shaft 9.

Instead of using a ball retainer, such as 17, we may employ a rotatable plate 26 having a seat 27 to receive the ball, said plate being interposed between ball 8 and spring 16. In this latter instance, the end of shaft 9 will engage plate 26 instead of bearing against ball 8, as in the form illustrated in Fig. 1. The cage 7, when applied, will be screwed up until the proper contact is made between ball 8 and seat 23 in the end of shaft 9, or until plate 26 engages shaft 9. As cage 7 is self-locking, a fine adjustment can be effected.

By means of our improved structure, we are able to provide an inexpensive efficient thrust bearing for light machinery particularly. It will, of course, be understood that we employ a suitable lubricant.

What we desire to secure by Letters Patent is:—

1. In a thrust bearing structure, a support, a projection carried thereby, arranged for the passage therethrough of a shaft, a cage, said cage at one end engaging said projection, and adjustable longitudinally thereof, an anti-frictional member within the cage, a retainer therefor, and a spring also within the cage acting at one end against said projection and at the other end against said retainer.

2. In a thrust bearing structure, a support, a threaded lug carried thereby arranged for the passage therethrough of a shaft, a cage at one end threaded onto said lug and adjustable longitudinally of the lug, an anti-frictional member located at the opposite end of the cage, a retainer for the anti-frictional device, a thrust plate bearing against the projection on the support, and a spring bearing, at one end, against the thrust plate and at the other end against said retainer.

3. A cage arranged for attachment to a support for a shaft, an anti-friction ball at one end of the cage, a thrust collar at the other end of the cage arranged for the passage of a shaft therethrough, and a spring between the ball retainer and thrust collar tending to force same against their respective ends of the cage.

4. In combination with a support having an opening for a shaft, a cage adjustable longitudinally of the support and in parallelism with the axis of the opening for a shaft, an anti-friction device carried by the cage to engage the end of a shaft, and a spring carried by the cage to lock the cage in position on said support.

5. In combination with a support having an opening for a shaft, a cage adjustable longitudinally of the support and in parallelism with the axis of the opening for the shaft said support forming a closure for one end of the cage, a retainer at one end of the cage but unattached thereto, an anti-friction ball held by the retainer, a thrust-plate at the other end of the cage, and a spring acting to force the thrust plate against its end of the cage, and said ball retainer against the other end of the cage to hold the anti-friction ball in position.

6. In combination with a support having an opening for a shaft, a cage arranged for attachment to said support and adjustable longitudinally of the support, an anti-friction device carried by the cage to engage the end of a shaft, a spring within the cage, and means formed on the cage to engage the shaft support to place said spring under tension when said cage is applied to the support, whereby said spring will lock said cage in position.

7. A cage arranged for attachment to a support for a shaft said cage forming a housing for a portion of said support, an anti-friction ball at one end of the cage, a rotatable plate bearing against the ball which in turn engages the end of a shaft, a spring bearing at one end against the plate and at the other end against a projected portion of said housing, and means whereby said cage may be adjusted relatively to said supporting portion.

JOHN J. McQUAID.
NICHOLAS W. SAMUELS.